United States Patent
Chiu et al.

(10) Patent No.: US 8,854,437 B2
(45) Date of Patent: Oct. 7, 2014

(54) DOUBLE-LAYER SWITCHABLE STEREO LIQUID CRYSTAL DISPLAY AND OPERATION METHOD THEREOF

(75) Inventors: Chun-Chieh Chiu, Taoyuan County (TW); Tzu-Chiang Shen, Taoyuan County (TW); Hsiang-Tan Lin, Keelung (TW); Shih-Chieh Lin, New Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 418 days.

(21) Appl. No.: 13/445,902

(22) Filed: Apr. 12, 2012

(65) Prior Publication Data
US 2013/0215103 A1 Aug. 22, 2013

(30) Foreign Application Priority Data
Feb. 17, 2012 (TW) .............................. 101105251 A

(51) Int. Cl.
*H04N 13/04* (2006.01)
(52) U.S. Cl.
CPC ................................ *H04N 13/0434* (2013.01)
USPC .......................................... 348/51; 345/418
(58) Field of Classification Search
CPC ................................................. H04N 13/0434
USPC ........................................... 348/51; 345/418
See application file for complete search history.

(56) References Cited

U.S. PATENT DOCUMENTS

| | | | |
|---|---|---|---|
| 7,755,707 B2 | 7/2010 | Roosendaal | |
| 2004/0239698 A1 | 12/2004 | Kamada | |
| 2010/0265230 A1* | 10/2010 | Kang | 345/211 |
| 2010/0302634 A1* | 12/2010 | Jung | 359/465 |
| 2011/0227886 A1* | 9/2011 | Lee et al. | 345/204 |
| 2012/0033053 A1* | 2/2012 | Park et al. | 348/51 |
| 2012/0105749 A1* | 5/2012 | Tseng et al. | 349/15 |
| 2012/0162206 A1* | 6/2012 | Nam et al. | 345/419 |
| 2012/0268453 A1* | 10/2012 | Hwang et al. | 345/419 |
| 2012/0280979 A1* | 11/2012 | Hwang | 345/419 |
| 2013/0057791 A1* | 3/2013 | Kitayama et al. | 349/15 |
| 2013/0235019 A1* | 9/2013 | Kim et al. | 345/212 |

FOREIGN PATENT DOCUMENTS

TW 201108713 3/2011

* cited by examiner

*Primary Examiner* — Jayanti K Patel
*Assistant Examiner* — Francis G Geroleo
(74) *Attorney, Agent, or Firm* — Winston Hsu; Scott Margo

(57) ABSTRACT

A double-layer switchable stereo liquid crystal display includes a timing controller, a microprocessor, a backlight module, a first liquid crystal panel, a controller, and a second liquid crystal panel. The timing controller receives an image signal and generates a left/right eye signal and a two-dimensional/three-dimensional control signal. The microprocessor outputs the image signal, and generates a control signal and a backlight control signal according to output timing of the image signal. The first liquid crystal panel receives and displays the image signal. The controller outputs a voltage control signal according to the control signal. The second liquid crystal panel rotates liquid crystal within the second liquid crystal panel according to the voltage control signal. A period for the second liquid crystal panel rotating the liquid crystal to a second angle is longer than a period for the second liquid crystal panel rotating the liquid crystal to a first angle.

23 Claims, 7 Drawing Sheets

DOUBLE-LAYER SWITCHABLE STEREO LIQUID CRYSTAL DISPLAY AND OPERATION METHOD THEREOF

BACKGROUND OF THE INVENTION

1. Field of the Invention

The present invention relates to a double-layer switchable stereo liquid crystal display and an operation method thereof, and particularly to a double-layer switchable stereo liquid crystal display and an operation method thereof that can reduce crosstalk of a three-dimensional image displayed on the double-layer switchable stereo liquid crystal display and increase luminance of a three-dimensional image or a two-dimensional image displayed on the double-layer switchable stereo liquid crystal display.

2. Description of the Prior Art

Please refer to FIG. 1 and FIG. 2. FIG. 1 is a diagram illustrating a double-layer switchable stereo liquid crystal display 100, and FIG. 2 is a diagram illustrating operation timing of the double-layer switchable stereo liquid crystal display 100 according to the prior art. As shown in FIG. 1, the double-layer switchable stereo liquid crystal display 100 includes a first liquid crystal panel 102, a backlight module 104, and a second liquid crystal panel 106. In addition, a left eye lens 1102 of a pair of polarized glasses 110 has a polarized coating of a first angle (such as) 135°, and a right eye lens 1064 of the pair of polarized glasses 110 has a polarized coating of a second angle (such as) 45°. As shown in FIG. 2, at a period T1, because the first liquid crystal panel 102 rotates liquid crystals within the first liquid crystal panel 102 according to a right eye image signal of a three-dimensional image signal received by the first liquid crystal panel 102, the backlight module 104 turns off a backlight, resulting in an observer not watching crosstalk between a left eye image and the right eye image of the three-dimensional image signal. Meanwhile, the second liquid crystal panel 106 rotates liquid crystals within the second liquid crystal panel 106 to the second angle according to a first voltage V1 received by the second liquid crystal panel 106. At a period T2 (that is, a vertical blanking interval VBLANK of the first liquid crystal panel 102), the backlight module 104 turns on the backlight. At the period T2, because the liquid crystals within the second liquid crystal panel 106 are also rotated to the second angle, a right eye of the observer can watch the right eye image signal of the three-dimensional image having polarization of the second angle through the right eye lens 1104 of the pair of polarized glasses 110. Similarly, at a period T3, because the first liquid crystal panel 102 rotates the liquid crystals within the first liquid crystal panel 102 according to the left eye image signal of the three-dimensional image signal received by the first liquid crystal panel 102, the backlight module 104 turns off the backlight, resulting in the observer not watching crosstalk between the left eye image and the right eye image of the three-dimensional image signal. Meanwhile, the second liquid crystal panel 106 rotates the liquid crystals within the second liquid crystal panel 106 to the first angle according to a second voltage V2 received by the second liquid crystal panel 106. At a period T4, the backlight module 104 turns on the backlight. At the period T4, because the liquid crystals within the second liquid crystal panel 106 are also rotated to the first angle, a left eye of the observer can watch the left eye image signal of the three-dimensional image having polarization of the first angle through the left eye lens 1102 of the pair of polarized glasses 110. In addition, as shown in FIG. 2, a period T5 is a period for the first liquid crystal panel 102 rotating the liquid crystals within the first liquid crystal panel 102 according to the right eye image signal of the three-dimensional image received by the first liquid crystal panel 102, a period T7 is a period for the first liquid crystal panel 102 rotating the liquid crystals within the first liquid crystal panel 102 according to the left eye image signal of the three-dimensional image received by the first liquid crystal panel 102, and periods T6 and T8 are periods for the backlight module 104 turning on the backlight. Thus, as shown in FIG. 2, at the period T8, the left eye of the observer can watch the left eye image of the three-dimensional image having polarization of the first angle through the left eye lens 1102 of the pair of polarized glasses 110, and at the period T6, the right eye of the observer can watch the right eye image signal of the three-dimensional image having polarization of the second angle through the right eye lens 1104 of the pair of polarized glasses 110. In addition, at the period T5, the second liquid crystal panel 106 rotates the liquid crystals within the second liquid crystal panel 106 to the second angle according to a third voltage V3 received by the second liquid crystal panel 106 to prevent the liquid crystals within the second liquid crystal panel 106 from being stuck.

However, as shown in FIG. 2, because a discharged speed of the liquid crystals within the second liquid crystal panel 106 (corresponding to the period T3 and the period T7) is faster than a charged speed of the liquid crystals within the second liquid crystal panel 106 (corresponding to the period T1 and the period T5) and a period for the second liquid crystal panel 106 rotating the liquid crystals within the second liquid crystal panel 106 to the first angle (corresponding to the periods T1 plus T2, and the periods T5 plus T6) is equal to a period for rotating the liquid crystals within the second liquid crystal panel 106 to the second angle (corresponding to the periods T3 plus T4, and the periods T7 plus T8), luminance of the left eye image of the three-dimensional image sensed by the observer is greater than luminance of the right eye image of the three-dimensional image sensed by the observer. That is to say, a luminance integration area corresponding to the left eye of the observer (a dotted line circle 202 in FIG. 2) is greater than a luminance integration area corresponding to the right eye of the observer (a dotted line circle 204 in FIG. 2), so luminance sensed by the left eye of the observer is different from luminance sensed by the right eye of the observer.

SUMMARY OF THE INVENTION

An embodiment provides a double-layer switchable stereo liquid crystal display. The double-layer switchable stereo liquid crystal display includes a timing controller, a microprocessor, a backlight module, a first liquid crystal panel, a controller, and a second liquid crystal panel. The timing controller is used for receiving an image signal, and generating a left/right eye signal and a two-dimensional/three-dimensional control signal according to the image signal. The microprocessor is coupled to the timing controller for outputting the image signal according to the left/right eye signal and the two-dimensional/three-dimensional control signal, and outputting a control signal and a backlight control signal corresponding to a vertical blanking interval according to output timing of the image signal. The backlight module is coupled to the microprocessor for turning on backlight according to the backlight control signal. The first liquid crystal panel is coupled to the microprocessor for receiving and displaying the image signal. The controller is coupled to the microprocessor for outputting a voltage control signal according to the control signal. The second liquid crystal panel is coupled to the controller for rotating liquid crystals within the second liquid crystal panel to a first angle or a second angle according to the voltage control signal. A period for the second liquid crystal panel starting to be charged to rotate the liquid crystals within the second liquid crystal panel to the second angle according to the voltage control signal is longer than a period for the second liquid crystal panel starting to be discharged to rotate the liquid crystals within the second liquid crystal panel to the first angle according to the voltage control signal.

Another embodiment provides an operation method of a double-layer switchable stereo liquid crystal display, where the double-layer switchable stereo liquid crystal display comprises a timing controller, a microprocessor, a backlight module, a first liquid crystal panel, a second liquid crystal panel, and a controller. The operation method includes receiving an image signal; generating a left/right eye signal and a two-dimensional/three-dimensional control signal according to the image signal; outputting the image signal according to the left/right eye signal and the two-dimensional/three-dimensional control signal; outputting a control signal and a backlight control signal corresponding to a vertical blanking interval according to output timing of the image signal; outputting a voltage control signal according to the control signal; rotating liquid crystals within the second liquid crystal panel to a first angle or a second angle according to the voltage control signal; turning on backlight according to the backlight control signal; and receiving and displaying the image signal. A period for the second liquid crystal panel starting to be charged to rotate the liquid crystals within the second liquid crystal panel to the second angle according to the voltage control signal is longer than a period for the second liquid crystal panel starting to be discharged to rotate the liquid crystals within the second liquid crystal panel to the first angle according to the voltage control signal.

The present invention provides a double-layer switchable stereo liquid crystal display and an operation method thereof. The double-layer switchable stereo liquid crystal display and the operation method utilize an asymmetric voltage control signal of a second liquid crystal panel to rotate liquid crystals within the second liquid crystal panel. Therefore, a period for the second liquid crystal panel starting to be charged to rotate the liquid crystals within the second liquid crystal panel to a second angle according to the voltage control signal is longer than a period for the second liquid crystal panel starting to be discharged to rotate the liquid crystals within the second liquid crystal panel to a first angle according to the voltage control signal. Thus, compared to the prior art, the present invention can reduce a period for the liquid crystals within the second liquid crystal panel being rotated from the first angle to the second angle to improve crosstalk of a first liquid crystal panel, increase luminance of an image signal (a three-dimensional image or a two-dimensional image), and balance a difference between luminance of an image signal sensed by a left eye of an observer and luminance of an image signal sensed by a right eye of the observer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
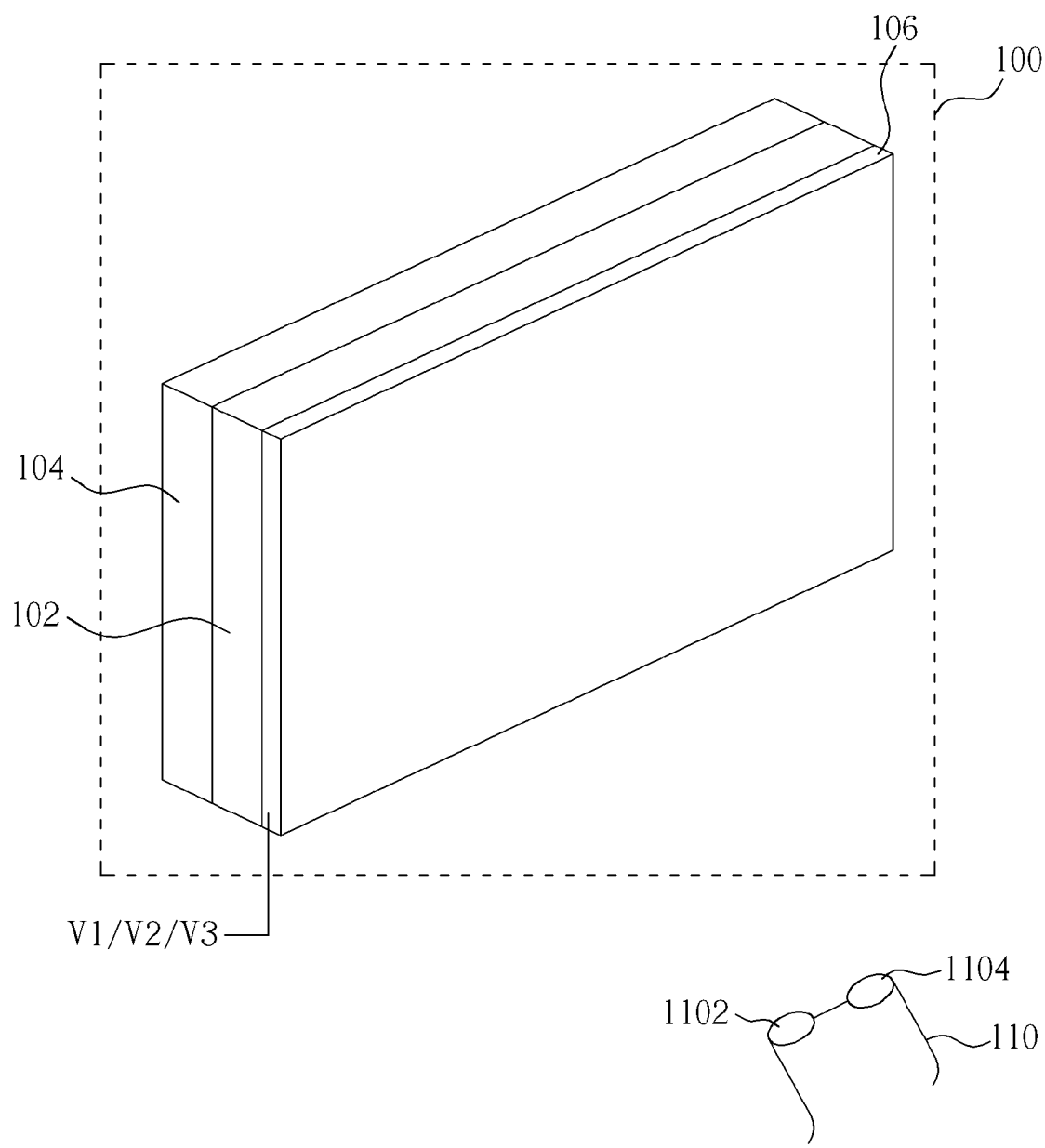
FIG. 1 is a diagram illustrating a double-layer switchable stereo liquid crystal display.
Figure 1:
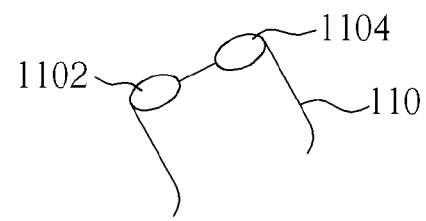
Figure 2:
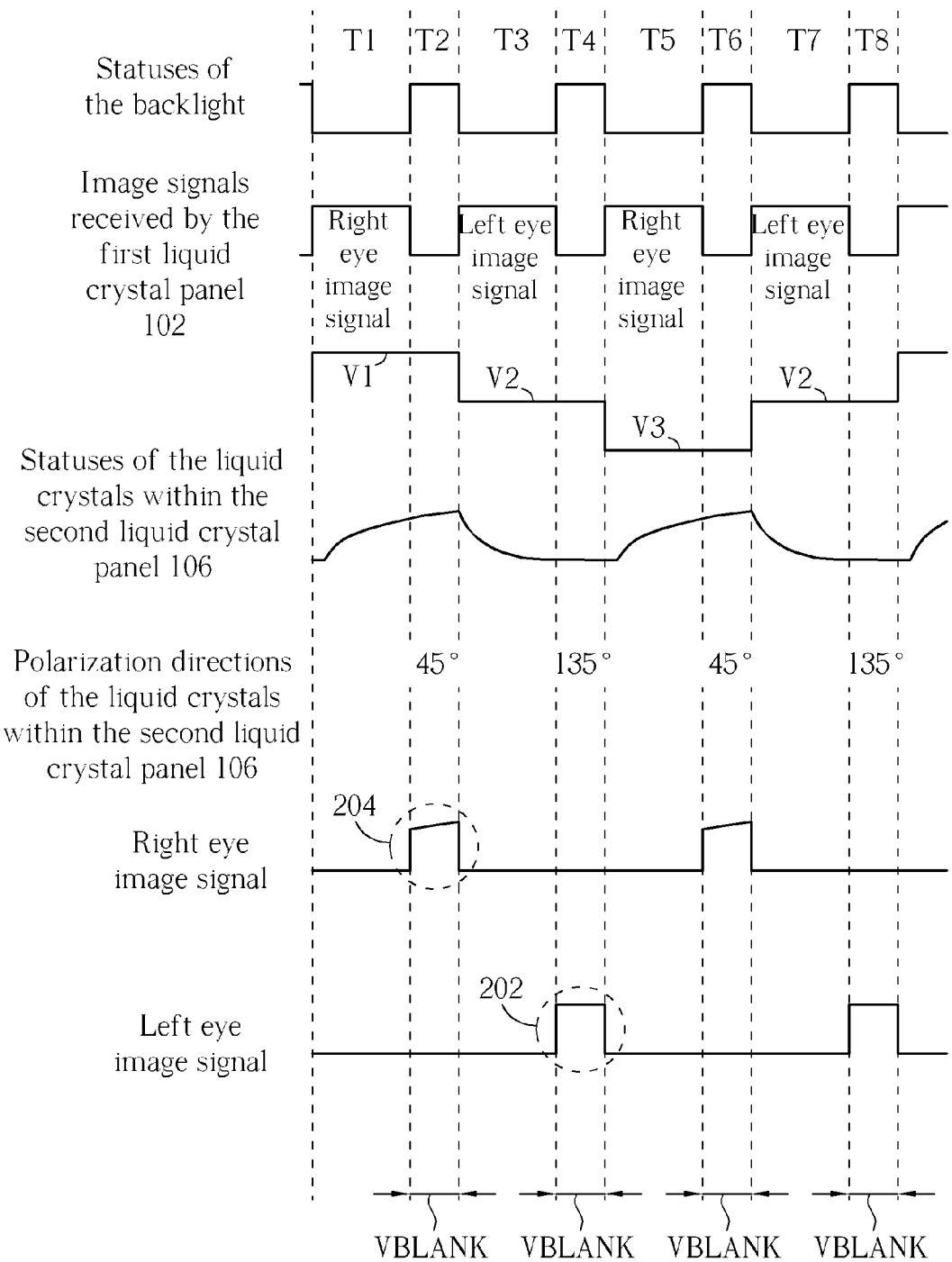
FIG. 2 is a diagram illustrating operation timing of the double-layer switchable stereo liquid crystal display according to the prior art.
Figure 3:
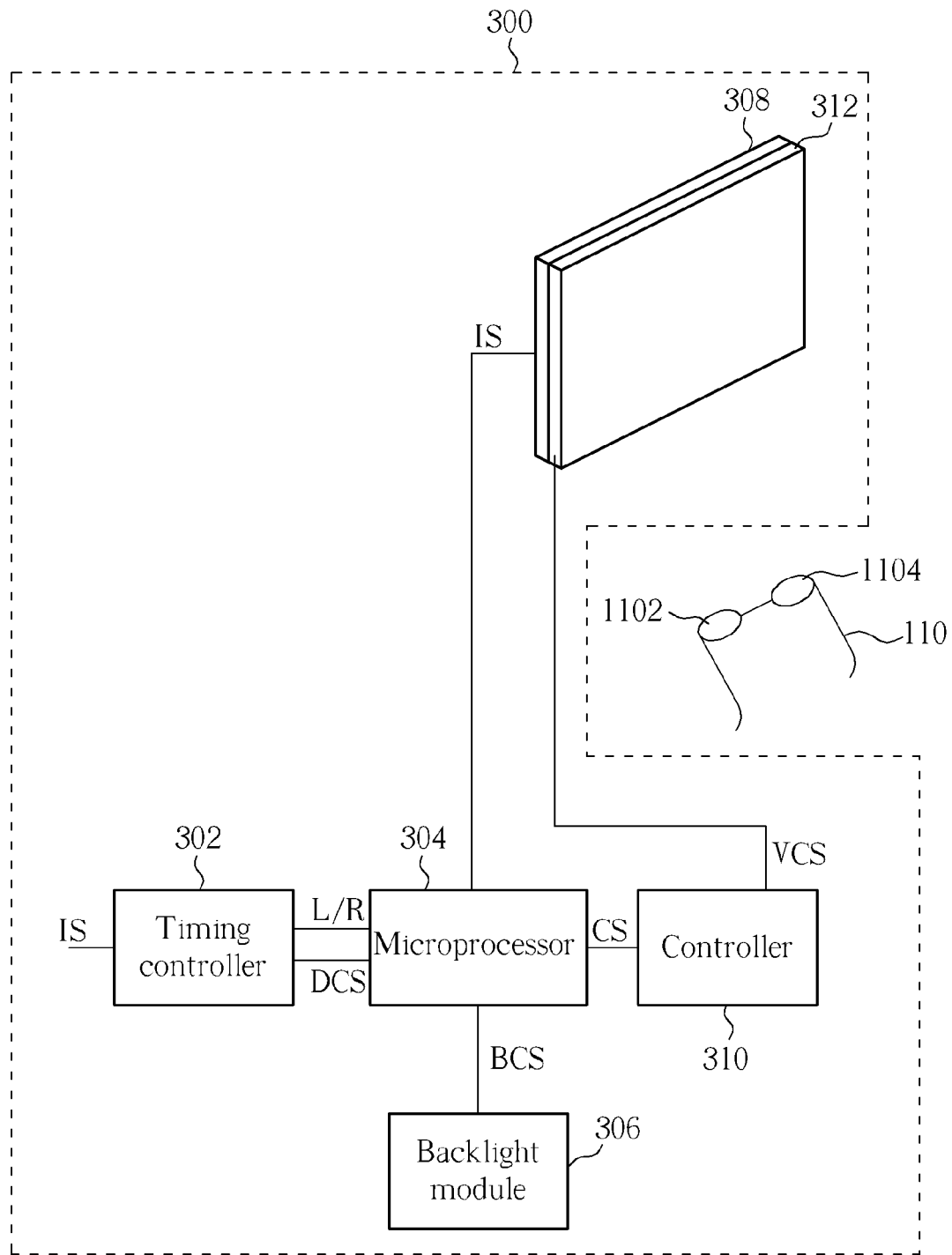
FIG. 3 is a diagram illustrating a double-layer switchable stereo liquid crystal display according to an embodiment.

Please refer to FIG. 3. FIG. 3 is a diagram illustrating a double-layer switchable stereo liquid crystal display 300 according to an embodiment. The double-layer switchable stereo liquid crystal display 300 includes a timing controller 302, a microprocessor 304, a backlight module 306, a first liquid crystal panel 308, a controller 310, and a second liquid crystal panel 312, where the second liquid crystal panel 312 is installed in front of the first liquid crystal panel 308. The timing controller 302 is used for receiving an image signal IS, and generating a left/right eye signal L/R and a two-dimensional/three-dimensional control signal DCS according to the image signal IS. The microprocessor 304 is coupled to the timing controller 302 for outputting the image signal IS to the first liquid crystal panel 308 according to the left/right eye signal L/R and the two-dimensional/three-dimensional control signal DCS, and outputting a control signal CS and a backlight control signal BCS corresponding to a vertical blanking interval VBLANK of the first liquid crystal panel 308 according to output timing of the image signal IS. The backlight module 306 is coupled to the microprocessor 304 for turning on a backlight according to the backlight control signal BCS. The first liquid crystal panel 308 is coupled to the microprocessor 304 for receiving and displaying the image signal IS. The controller 310 is coupled to the microprocessor 304 for outputting a voltage control signal VCS according to the control signal CS. The second liquid crystal panel 312 is coupled to the controller 310 for rotating liquid crystals within the second liquid crystal panel 312 to a first angle (such as) 135° or a second angle (such as) 45° according to the voltage control signal VCS. A period for the second liquid crystal panel 312 starting to be charged to rotate the liquid crystals within the second liquid crystal panel 312 to the second angle according to the voltage control signal VCS is longer than a period for the second liquid crystal panel 312 starting to be discharged to rotate the liquid crystals within the second liquid crystal panel 312 to the first angle according to the voltage control signal VCS. In addition, a left eye lens 1102 of a pair of polarized glasses 110 has a polarized coating of the first angle, and a right eye lens 1104 of the polarized glasses 110 has a polarized coating of the second angle.

Figure 4:
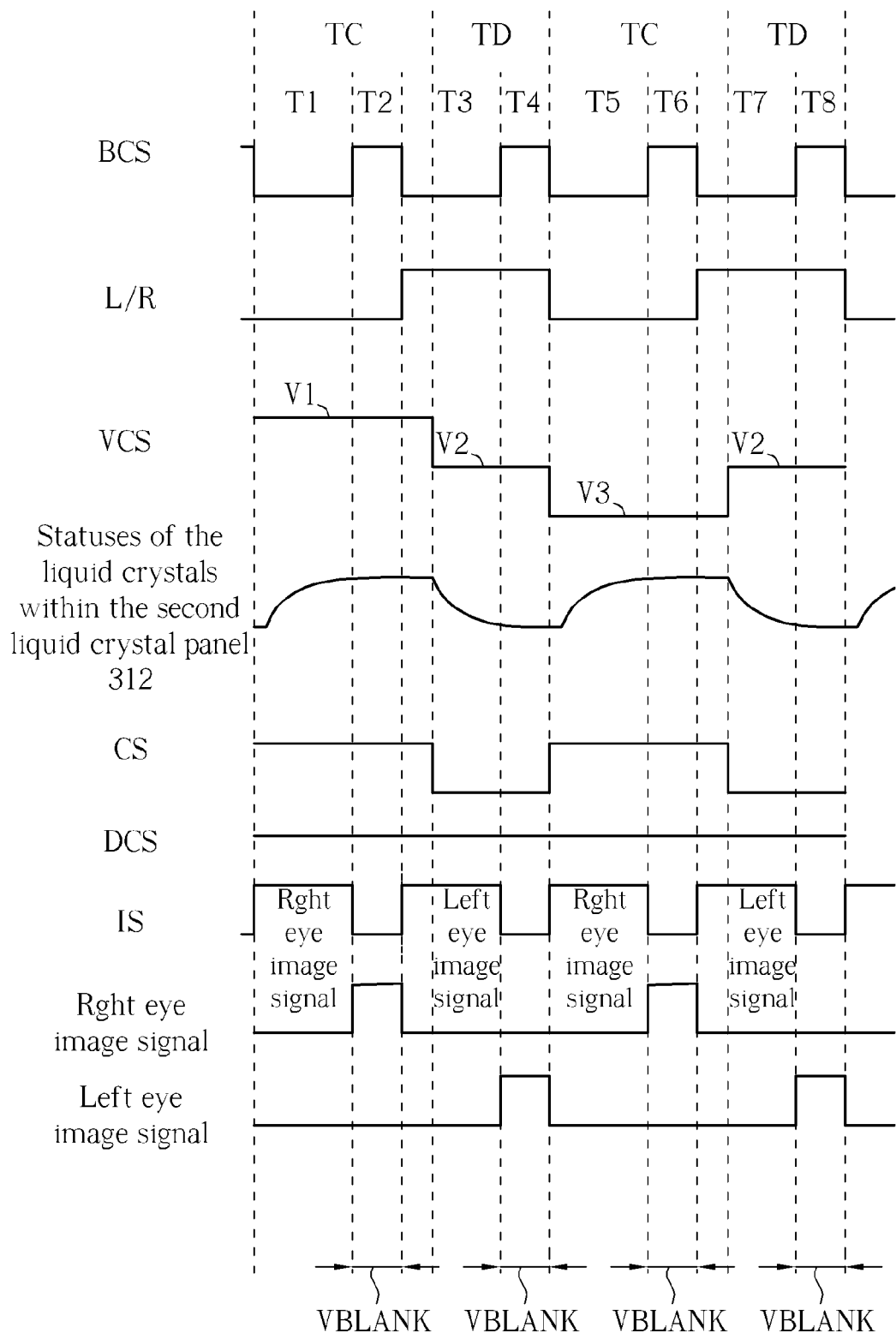
FIG. 4 is a diagram illustrating operation timing of the double-layer switchable stereo liquid crystal display according to a first embodiment.

Please refer to FIG. 3 and FIG. 4. FIG. 4 is a diagram illustrating operation timing of the double-layer switchable stereo liquid crystal display 300 according to a first embodiment. As shown in FIG. 4, at a period T1, the microprocessor 304 outputs a right eye image signal of the image signal IS (a three-dimensional image) to the first liquid crystal panel 308 according to the low voltage level left/right eye signal L/R and the high voltage level two-dimensional/three-dimensional control signal DCS. But, in another embodiment of the present invention, the microprocessor 304 outputs a right eye image signal of the image signal IS to the first liquid crystal panel 308 according to the high voltage level left/right eye signal L/R. At the period T1, because the first liquid crystal panel 308 rotates liquid crystals within the first liquid crystal panel 308 according to the right eye image signal of the image signal IS received by the first liquid crystal panel 308 and the microprocessor 304 does not output the backlight control signal BCS, the backlight module 104 turns off the backlight, resulting in an observer not watching crosstalk between a left eye image and the right eye image of the image signal IS. In addition, the microprocessor 304 outputs the high voltage level control signal CS to the controller 310 according to the output timing of the image signal IS (at the period T1, the microprocessor 304 outputs the right eye image signal of the image signal IS), and the controller 310 outputs the voltage control signal VCS with a first voltage V1 to the second liquid crystal panel 312 according to the high voltage level control signal CS to make the liquid crystals within the second liquid crystal panel 312 be rotated to the second angle. Therefore, the second liquid crystal panel 312 starts to be charged to rotate the liquid crystals within the second liquid crystal panel 312 to the second angle according to the first voltage V1. At a period T2 (that is, the vertical blanking interval VBLANK of the first liquid crystal panel 308), the backlight module 306 turns on the backlight according to the backlight control signal BCS outputted by the microprocessor 304. At the period T2, because the liquid crystals within the second liquid crystal panel 312 are rotated to the second angle, a right eye of the observer can watch the right eye image signal of the image signal IS having polarization of the second angle through the right eye lens 1104 of the pair of polarized glasses 110. Similarly, at a period T3, the microprocessor 304 outputs a left eye image signal of the image signal IS to the first liquid crystal panel 308 according to the high voltage level left/right eye signal L/R and the high voltage level two-dimensional/three-dimensional control signal DCS. But, in another embodiment of the present invention, the microprocessor 304 outputs the left eye image signal of the image signal IS to the first liquid crystal panel 308 according to the low voltage level left/right eye signal L/R. At the period T3, because the first liquid crystal panel 308 rotates the liquid crystals within the first liquid crystal panel 308 according to the left eye image signal of the image signal IS received by the first liquid crystal panel 308 and the microprocessor 304 does not output the backlight control signal BCS, the backlight module 306 turns off the backlight, resulting in the observer not watching crosstalk between the left eye image and the right eye image of the image signal IS. In addition, after the period T2 (that is, within the period T3), the microprocessor 304 outputs the low voltage level control signal CS to the controller 310 according to the output timing of the image signal IS (at the period T3, the microprocessor 304 outputs the left eye image signal of the image signal IS), so the controller 310 outputs the voltage control signal VCS with a second voltage V2 to the second liquid crystal panel 312 according to the low voltage level control signal CS to make the liquid crystals within the second liquid crystal panel 312 be rotated to the first angle. Therefore, the second liquid crystal panel 312 starts to be discharged to rotate the liquid crystals within the second liquid crystal panel 312 to the first angle according to the second voltage V2. At a period T4 (that is, the vertical blanking interval VBLANK of the first liquid crystal panel 308), the backlight module 306 turns on the backlight according to the backlight control signal BCS outputted by the microprocessor 304. At the period T4, because the liquid crystals within the second liquid crystal panel 312 are rotated to the first angle, a left eye of the observer can watch the left eye image signal of the image signal IS having polarization of the first angle through the left eye lens 1102 of the pair of polarized glasses 110. In addition, as shown in FIG. 4, the operation timing of the double-layer switchable stereo liquid crystal display 300 from a period T5 to a period T8 is the same as the operation timing of the double-layer switchable stereo liquid crystal display 300 from the period T1 to the period T4, so further description thereof is omitted for simplicity. In addition, as shown in FIG. 4, because a period for the second liquid crystal panel 312 starting to be charged to rotate the liquid crystals within the second liquid crystal panel 312 to the second angle according to the voltage control signal VCS (that is, a period TC for the second liquid crystal panel 312 starting to be charged according to the first voltage V1 or a third voltage V3) is longer than a period for the second liquid crystal panel 312 starting to be discharged to rotate the liquid crystals within the second liquid crystal panel 312 to the first angle according to the voltage control signal VCS (that is, a period TD for the second liquid crystal panel 312 starting to be discharged according to the second voltage V2), luminance of the left eye image signal sensed by the left eye of the observer is similar to luminance of the right eye image signal sensed by the right eye of the observer. In addition, the present invention is not limited to timings of voltage levels of the two-dimensional/three-dimensional control signal DCS and the control signal CS in FIG. 4.

Figure 5:
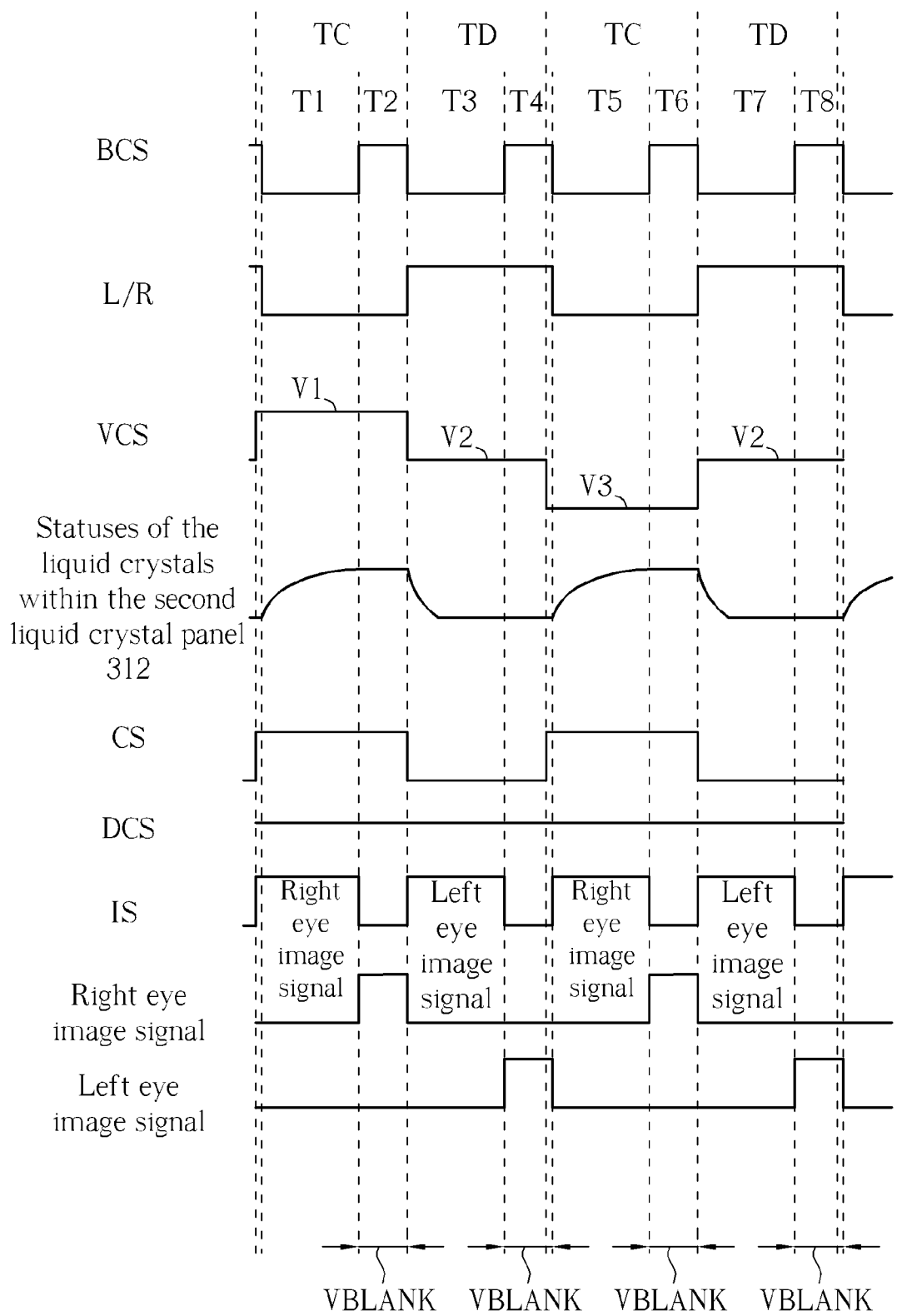
FIG. 5 is an operation timing diagram illustrating the double-layer switchable stereo liquid crystal display according to a second embodiment.

Please refer to FIG. 3 and FIG. 5. FIG. 5 is an operation timing diagram illustrating the double-layer switchable stereo liquid crystal display 300 according to a second embodiment. As shown in FIG. 5, before a period T1 and at the period T1, the microprocessor 304 outputs a high voltage level control signal CS to the controller 310 according to output timing (at the period T1, the microprocessor 304 outputs a right eye image signal of the image signal IS) of an image signal IS (a three-dimensional image), so the controller 310 outputs a voltage control signal VCS with a first voltage V1 to the second liquid crystal panel 312 according to the high voltage level control signal CS to make the liquid crystals within the second liquid crystal panel 312 be rotated to the second angle. Therefore, the second liquid crystal panel 312 starts to be charged to rotate the liquid crystals within the second liquid crystal panel 312 to the second angle according to the first voltage V1. At the period T1, the microprocessor 304 outputs the right eye image signal of the image signal IS to the first liquid crystal panel 308 according to a low voltage level left/right eye signal L/R and a high voltage level two-dimensional/three-dimensional control signal DCS. But, in another embodiment of the present invention, the microprocessor 304 outputs the right eye image signal of the image signal IS to the first liquid crystal panel 308 according to the high voltage level left/right eye signal L/R. At the period T1, because the first liquid crystal panel 308 rotates the liquid crystals within the first liquid crystal panel 308 according to the right eye image signal of the image signal IS and the microprocessor 304 does not output a backlight control signal BCS, the backlight module 306 turns off the backlight, resulting in the observer not watching crosstalk between a left eye image and the right eye image of the image signal IS. In addition, at a period T2, the backlight module 306 turns on the backlight according to the backlight control signal BCS outputted by the microprocessor 304. At the period T2, because the liquid crystals within the second liquid crystal panel 312 are rotated to the second angle, the right eye of the observer can watch the right eye image signal of the image signal IS having polarization of the second angle through the right eye lens 1104 of the pair of polarized glasses 110. At a period T3, the microprocessor 304 outputs a left eye image signal of the image signal IS to the first liquid crystal panel 308 according to the high voltage level left/right eye signal L/R and the high voltage level two-dimensional/three-dimensional control signal DCS. But, in another embodiment of the present invention, the microprocessor 304 outputs the left eye image signal of the image signal IS to the first liquid crystal panel 308 according to the low voltage level left/right eye signal L/R. At the period T3, because the first liquid crystal panel 308 rotates the liquid crystals within the first liquid crystal panel 308 according to the left eye image signal of the image signal IS and the microprocessor 304 does not output backlight control signal BCS, the backlight module 306 turns off the backlight, resulting in the observer not watching crosstalk between the left eye image and the right eye image of the image signal IS. In addition, the microprocessor 304 outputs the low voltage level control signal CS to the controller 310 according to the output timing of the image signal IS (at the period T3, the microprocessor 304 outputs the left eye image signal of the image signal IS), so the controller 310 outputs the voltage control signal VCS with a second voltage V2 to the second liquid crystal panel 312 according to the low voltage level control signal CS to make the liquid crystals within the second liquid crystal panel 312 be rotated to the first angle. Therefore, the second liquid crystal panel 312 starts to be discharged to rotate the liquid crystals within the second liquid crystal panel 312 to the first angle according to the second voltage V2. At a period T4, the backlight module 306 turns on the backlight according to the backlight control signal BCS outputted by the microprocessor 304. At the period T4, because the liquid crystals within the second liquid crystal panel 312 are rotated to the first angle, the left eye of the observer can watch the left eye image signal of the image signal IS having polarization of the first angle through the left eye lens 1102 of the pair of polarized glasses 110. In addition, as shown in FIG. 5, the operation timing of the double-layer switchable stereo liquid crystal display 300 from a period T5 to a period T8 is the same as the operation timing of the double-layer switchable stereo liquid crystal display 300 from the period T1 to the period T4, so further description thereof is omitted for simplicity. In addition, as shown in FIG. 5, because a period for the second liquid crystal panel 312 starting to be charged to rotate the liquid crystals within the second liquid crystal panel 312 to the second angle according to the voltage control signal VCS (that is, a period TC for the second liquid crystal panel 312 starting to be charged according to the first voltage V1 or a third voltage V3) is longer than a period for the second liquid crystal panel 312 starting to be discharged to rotate the liquid crystals within the second liquid crystal panel 312 to the first angle according to the voltage control signal VCS (that is, a period TD for the second liquid crystal panel 312 starting to be discharged according to the second voltage V2), and the second liquid crystal panel 312 starts to be charged according to the voltage control signal VCS before the period T1 and before the period T5, luminance of the left eye image signal sensed by the left eye of the observer is similar to luminance of the right eye image signal sensed by the right eye of the observer and crosstalk of the first liquid crystal panel 308 can be reduced. In addition, the present invention is not limited to timings of voltage levels of the two-dimensional/three-dimensional control signal DCS and the control signal CS in FIG. 5.

Figure 6:
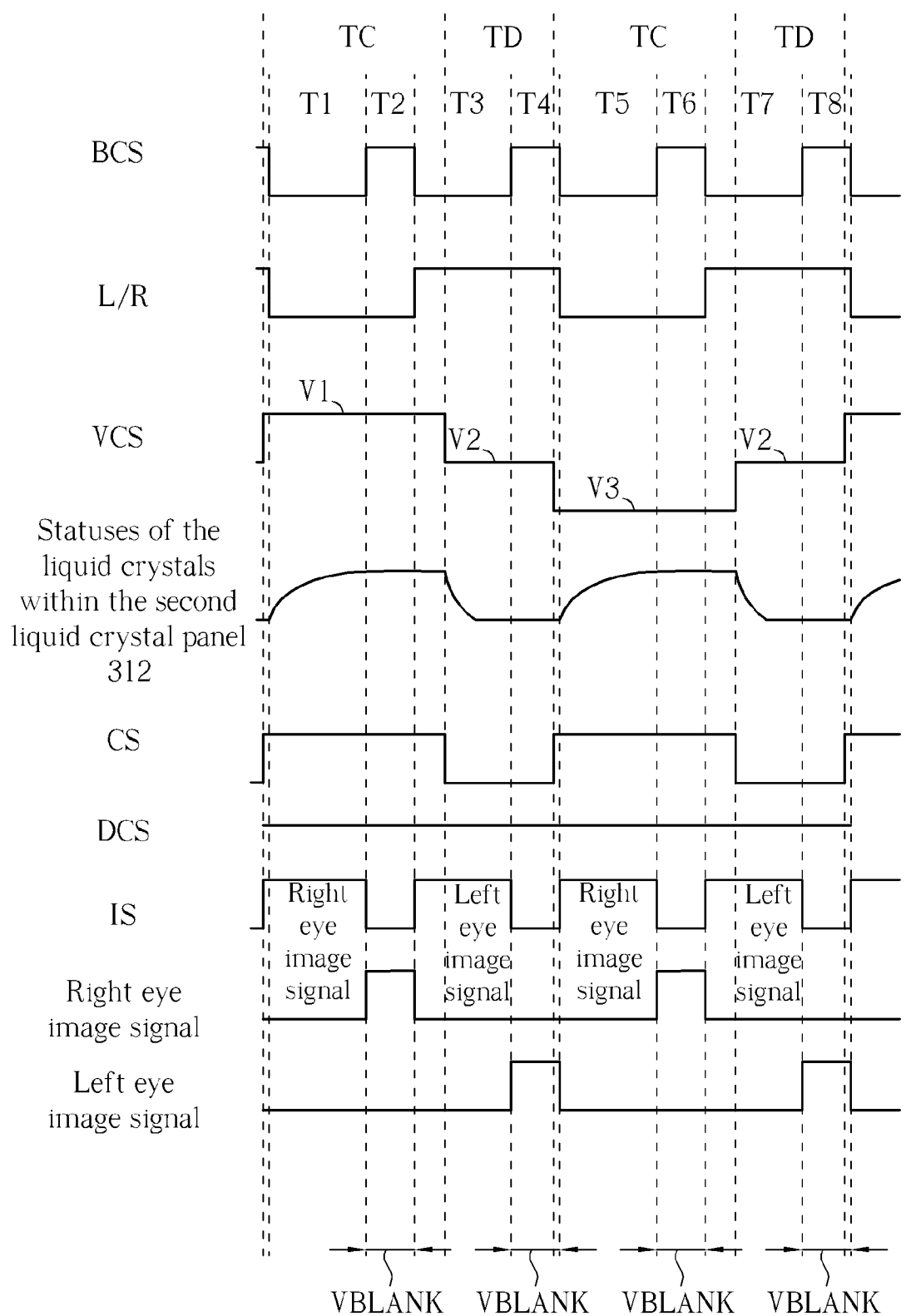
FIG. 6 is an operation timing diagram illustrating the double-layer switchable stereo liquid crystal display according to a third embodiment.

Please refer to FIG. 3 and FIG. 6. FIG. 6 is an operation timing diagram illustrating the double-layer switchable stereo liquid crystal display 300 according to a third embodiment. As shown in FIG. 6, before a period T1, the microprocessor 304 outputs a high voltage level control signal CS to the controller 310 according to output timing (at the period T1, the microprocessor 304 outputs a right eye image signal of an image signal IS) of the image signal IS (a three-dimensional image), so the controller 310 outputs a voltage control signal VCS with a first voltage V1 to the second liquid crystal panel 312 according to the high voltage level control signal CS to make the liquid crystals within the second liquid crystal panel 312 be rotated to the second angle. Therefore, the second liquid crystal panel 312 starts to be charged to rotate the liquid crystals within the second liquid crystal panel 312 to the second angle according to the first voltage V1. At the period T1, the microprocessor 304 outputs the right eye image signal of the image signal IS to the first liquid crystal panel 308 according to a low voltage level left/right eye signal L/R and a high voltage level two-dimensional/three-dimensional control signal DCS. But, in another embodiment of the present invention, the microprocessor 304 outputs the right eye image signal of the image signal IS to the first liquid crystal panel 308 according to the high voltage level left/right eye signal L/R. At the period T1, because the first liquid crystal panel 308 rotates the liquid crystals within the first liquid crystal panel 308 according to the right eye image signal of the image signal IS and the microprocessor 304 does not output backlight control signal BCS, the backlight module 306 turns off the backlight, resulting in the observer not watching crosstalk between a left eye image and the right eye image of the image signal IS. At a period T2 (that is, the vertical blanking interval VBLANK of the first liquid crystal panel 308), the backlight module 306 turns on the backlight according to the backlight control signal BCS outputted by the microprocessor 304. At the period T2, because the liquid crystals within the second liquid crystal panel 312 are rotated to the second angle, the right eye of the observer can watch the right eye image signal of the image signal IS having polarization of the second angle through the right eye lens 1104 of the pair of polarized glasses 110. Similarly, at a period T3, the microprocessor 304 outputs a left eye image signal of the image signal IS to the first liquid crystal panel 308 according to the high voltage level left/right eye signal L/R and the high voltage level two-dimensional/three-dimensional control signal DCS. But, in another embodiment of the present invention, the microprocessor 304 outputs the left eye image signal of the image signal IS to the first liquid crystal panel 308 according to the low voltage level left/right eye signal L/R. At the period T3, because the first liquid crystal panel 308 rotates the liquid crystals within the first liquid crystal panel 308 according to the left eye image signal of the image signal IS and the microprocessor 304 does not output backlight control signal BCS, the backlight module 306 turns off the backlight, resulting in the observer not watching crosstalk between the left eye image and the right eye image of the image signal IS. In addition, after the period T2 (that is, within the period T3), the microprocessor 304 outputs the low voltage level control signal CS to the controller 310 according to the output timing of the image signal IS (at the period T3, the microprocessor 304 outputs the left eye image signal of the image signal IS), and the controller 310 outputs the voltage control signal VCS with a second voltage V2 to second liquid crystal panel 312 according to the low voltage level control signal CS to make the liquid crystals within the second liquid crystal panel 312 be rotated to the first angle. Therefore, the second liquid crystal panel 312 starts to be discharged to rotate the liquid crystals within the second liquid crystal panel 312 to the first angle according to the second voltage V2. At a period T4 (that is, the vertical blanking period VBLANK of the first liquid crystal panel 308), the backlight module 306 turns on the backlight according to the backlight control signal BCS outputted by the microprocessor 304. At the period T4, because the liquid crystals within the second liquid crystal panel 312 are rotated to the first angle, a left eye of the observer can watch the left eye image signal of the image signal IS having polarization of the first angle through the left eye lens 1102 of the pair of polarized glasses 110. In addition, as shown in FIG. 6, the operation timing of the double-layer switchable stereo liquid crystal display 300 from a period T5 to a period T8 is the same as the operation timing of the double-layer switchable stereo liquid crystal display 300 from the period T1 to the period T4, so further description thereof is omitted for simplicity. In addition, as shown in FIG. 6, because a period for the second liquid crystal panel 312 starting to be charged to rotate the liquid crystals within the second liquid crystal panel 312 to the second angle (that is, a period TC for the second liquid crystal panel 312 starting to be charged according to the first voltage V1 or a third voltage V3) according to the voltage control signal VCS is longer than a period for the second liquid crystal panel 312 starting to be discharged to rotate the liquid crystals within the second liquid crystal panel 312 to the first angle (that is, a period TD for the second liquid crystal panel 312 starting to be discharged according to the second voltage V2), and the second liquid crystal panel 312 starts to be charged according to the voltage control signal VCS before the period T1 and before the period T5, luminance of the left eye image signal sensed by the left eye of the observer is similar to luminance of the right eye image signal sensed by the right eye of the observer and crosstalk of the first liquid crystal panel 308 can be reduced. In addition, the present invention is not limited to timings of voltage levels of the two-dimensional/three-dimensional control signal DCS and the control signal CS in FIG. 6.

In addition, in the embodiments in FIG. 4 to FIG. 6, when an image signal IS is a two-dimensional image, the microprocessor 304 outputs the image signal IS to the first liquid crystal panel 308 according to a left/right eye signal L/R and a low voltage level two-dimensional/three-dimensional control signal DCS. That is to say, the microprocessor 304 can output the image signal IS (the two-dimensional image) to the first liquid crystal panel 308 regardless of the low voltage level left/right eye signal L/R or the high voltage level left/right eye signal L/R. But, in another embodiment of the present invention, the microprocessor 304 outputs an image signal IS (a two-dimensional image) to the first liquid crystal panel 308 according to the high voltage level two-dimensional/three-dimensional control signal DCS, and outputs an image signal IS (a three-dimensional image) to the first liquid crystal panel 308 according to the low voltage level two-dimensional/three-dimensional control signal DCS. In the embodiments in FIG. 4 to FIG. 6, when an image signal IS is a two-dimensional image, the right eye of the observer can watch the image signal IS (the two-dimensional image) having polarization of the second angle through the right eye lens 1104 of the pair of polarized glasses 110 at the period T2 and the period T6, and the left eye of the observer can watch the image signal IS (the two-dimensional image) having polarization of the first angle through the left eye lens 1102 of the pair of polarized glasses 110 at the period T4 and the period T8. In addition, when an image signal IS is a two-dimensional image, the microprocessor 304 can keep outputting a backlight control signal BCS (that is, the backlight module 306 always turns on the backlight according to the backlight control signal BCS outputted by the microprocessor 304), or output the backlight control signal BCS according to timing of the backlight control signal BCS corresponding to a three-dimensional image. In addition, subsequent operational principles of the double-layer switchable stereo liquid crystal display 300 when the image signal IS is the two-dimensional image are the same as those of the double-layer switchable stereo liquid crystal display 300 when the image signal IS is the three-dimensional image, so further description thereof is omitted for simplicity.

Figure 7:
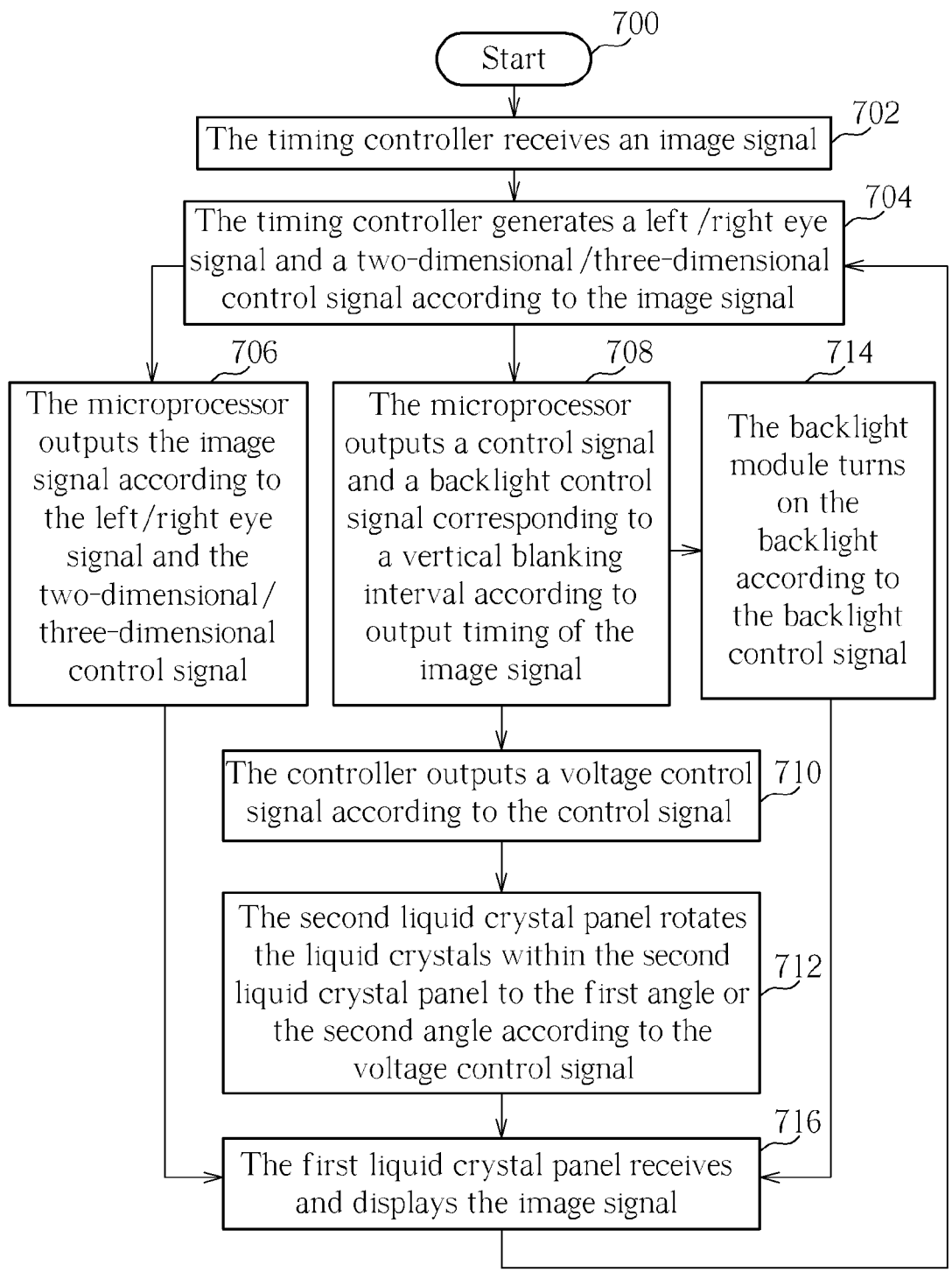
FIG. 7 is a flowchart illustrating an operation method of a double-layer switchable stereo liquid crystal display according to a fourth embodiment.

Please refer to FIG. 7, FIG. 3, FIG. 4, FIG. 5, and FIG. 6. FIG. 7 is a flowchart illustrating an operation method of a double-layer switchable stereo liquid crystal display according to a fourth embodiment. The method in FIG. 7 is illustrated using the double-layer switchable stereo liquid crystal display 300 in FIG. 3. Detailed steps are as follows:

Step 700: Start.

Step 702: The timing controller 302 receives an image signal IS.

Step 704: The timing controller 302 generates a left/right eye signal L/R and a two-dimensional/three-dimensional control signal DCS according to the image signal IS.

Step 706: The microprocessor 304 outputs the image signal IS according to the left/right eye signal L/R and the two-dimensional/three-dimensional control signal DCS.

Step 708: The microprocessor 304 outputs a control signal CS and a backlight control signal BCS corresponding to a vertical blanking interval according to output timing of the image signal IS.

Step 710: The controller 310 outputs a voltage control signal VCS according to the control signal CS.

Step 712: The second liquid crystal panel 312 rotates the liquid crystals within the second liquid crystal panel 312 to the first angle or the second angle according to the voltage control signal VCS.

Step 714: The backlight module 306 turns on the backlight according to the backlight control signal BCS.

Step 716: The first liquid crystal panel 308 receives and displays the image signal IS; go to Step 704.

Please refer to FIG. 3 and FIG. 4, and take the period T1 to the period T2 in FIG. 4 as an example.

In Step 702 and Step 704, at the period T1, the timing controller 302 generates the left/right eye signal L/R and the two-dimensional/three-dimensional control signal DCS according to the image signal IS. In Step 706, at the period T1, the microprocessor 304 outputs a right eye image signal of the image signal IS (a three-dimensional image) to the first liquid crystal panel 308 according to the low voltage level left/right eye signal L/R and the high voltage level two-dimensional/three-dimensional control signal DCS. At the period T1, because the first liquid crystal panel 308 rotates the liquid crystals within the first liquid crystal panel 308 according to the right eye image signal of the image signal IS, and the microprocessor 304 does not output the backlight control signal BCS, the backlight module 306 turns off the backlight, resulting in the observer not watching crosstalk between a left eye image and the right eye image of the image signal IS. In Step 708, at the period T1, the microprocessor 304 outputs the high voltage level control signal CS to the controller 310 according to output timing of the image signal IS (at the period T1, the microprocessor 304 outputs the right eye image signal of the image signal IS), and at the period T2, the microprocessor 304 outputs the backlight control signal BCS corresponding to the vertical blanking interval to the backlight module 306 according to the output timing of the image signal IS. In Step 710, the controller 310 outputs the voltage control signal VCS with a first voltage V1 to the second liquid crystal panel 312 to make the liquid crystals within the second liquid crystal panel 312 be rotated to the second angle according to the high voltage level control signal CS. In Step 712, the second liquid crystal panel 312 starts to be charged to rotate the liquid crystals within the second liquid crystal panel 312 to the second angle according to the first voltage V1. In Step 714, at the period T2, the backlight module 306 turns on the backlight according to the backlight control signal BCS outputted by the microprocessor 304. In Step 716, at the period T2, the first liquid crystal panel 308 receives and displays the image signal IS. Because the liquid crystals within the second liquid crystal panel 312 are rotated to the second angle, the right eye of the observer can watch the right eye image of the image signal IS having polarization of the second angle through the right eye lens 1104 of the pair of polarized glasses 110 at the period T2. In addition, after the period T2 (that is, within the period T3), the microprocessor 304 outputs the low voltage level control signal CS to the controller 310 according to the output timing of the image signal IS (at the period T3, the microprocessor 304 outputs the left eye image signal of the image signal IS), so the controller 310 outputs the voltage control signal VCS with a second voltage V2 to the second liquid crystal panel 312 to make the liquid crystals within the second liquid crystal panel 312 be rotated to the first angle according to the low voltage level control signal CS. Therefore, as shown in FIG. 4, because a period for the second liquid crystal panel 312 starting to be charged to rotate the liquid crystals within the second liquid crystal panel 312 to the second angle (that is, a period TC for the second liquid crystal panel 312 starting to be charged according to the first voltage V1 or a third voltage V3) according to the voltage control signal VCS is longer than a period for the second liquid crystal panel 312 starting to be discharged to rotate the liquid crystals within the second liquid crystal panel 312 to the first angle (that is, a period TD for the second liquid crystal panel 312 starting to be discharged according to the second voltage V2) according to the voltage control signal VCS, luminance of the left eye image sensed by the left eye of the observer is similar to luminance of the right eye image sensed by the right eye of the observer.

In addition, subsequent operational principles of the timing controller 302, the microprocessor 304, the backlight module 306, the first liquid crystal panel 308, the controller 310, and the second liquid crystal panel 312 at the period T3 to the period T8 in FIG. are the same as those of the timing controller 302, the microprocessor 304, the backlight module 306, the first liquid crystal panel 308, the controller 310, and the second liquid crystal panel 312 at the period T1 to the period T2 in FIG. 4, so further description thereof is omitted for simplicity.

Please refer to FIG. 3 and FIG. 5, and take the period T1 to the period T2 in FIG. 5 as an example.

In Step 702 and Step 704, before the period T1 and at the period T1, the timing controller 302 generates the left/right eye signal L/R and the two-dimensional/three-dimensional control signal DCS according to the image the signal IS. In Step 706, at the period T1, the microprocessor 304 outputs a right eye image signal of the image signal IS (a three-dimensional image) to the first liquid crystal panel 308 according to the low voltage level left/right eye signal L/R and the high voltage level two-dimensional/three-dimensional control signal DCS. At the period T1, because the first liquid crystal panel 308 rotates the liquid crystals within the first liquid crystal panel 308 according to the right eye image signal of the image signal IS, and the microprocessor 304 does not output backlight control signal BCS, the backlight module 306 turns off the backlight, resulting in the observer not watching crosstalk between a left eye image and the right eye image of the image signal IS. In Step 708, before the period T1 and at the period T1, the microprocessor 304 outputs the high voltage level control signal CS to the controller 310, and outputs the backlight control signal BCS to the backlight module 306 according to output timing of the image signal IS (at the period T1, the microprocessor 304 outputs the right eye image signal of the image signal IS). In Step 710, the controller 310 outputs a voltage control signal VCS with a first voltage V1 to the second liquid crystal panel 312 to make the liquid crystals within the second liquid crystal panel 312 be rotated to the second angle according to the high voltage level control signal CS. In Step 712, the second liquid crystal panel 312 starts to be charged to rotate the liquid crystals within the second liquid crystal panel 312 to the second angle according to the first voltage V1. In Step 714, at the period T2, the backlight module 306 turns on the backlight according to the backlight control signal BCS outputted by the microprocessor 304. In Step 716, at the period T2, the first liquid crystal panel 308 receives and displays the image signal IS. Because the liquid crystals within the second liquid crystal panel 312 are rotated to the second angle, the right eye of the observer can watch the right eye image signal of the image signal IS having polarization of the second angle through the right eye lens 1104 of the pair of polarized glasses 110 at the period T2. In addition, as shown in FIG. 5, because a period for the second liquid crystal panel 312 starting to be charged to rotate the liquid crystals within the second liquid crystal panel 312 to the second angle (that is, a period TC for the second liquid crystal panel 312 starting to be charged according to the first voltage V1 or a third voltage V3) is longer than a period for the second liquid crystal panel 312 starting to be discharged to rotate the liquid crystals within the second liquid crystal panel 312 to the first angle (that is, a period TD for the second liquid crystal panel 312 starting to be discharged according to the second voltage V2) according to the voltage control signal VCS, and the second liquid crystal panel 312 starts to be charged according to the voltage control signal VCS before the period T1 and at the period T1, luminance of the left eye image sensed by the left eye of the observer is similar to luminance of the right eye image sensed by the right eye of the observer, and crosstalk of the first liquid crystal panel 308 can be reduced.

In addition, subsequent operational principles of the timing controller 302, the microprocessor 304, the backlight module 306, the first liquid crystal panel 308, the controller 310, and the second liquid crystal panel 312 at the period T3 to the period T8 in FIG. are the same as those of the timing controller 302, the microprocessor 304, the backlight module 306, the first liquid crystal panel 308, the controller 310, and the second liquid crystal panel 312 at the period T1 to the period T2 in FIG. 5, so further description thereof is omitted for simplicity.

Please refer to FIG. 3 and FIG. 6, and take the period T1 to the period T2 in FIG. 6 as an example.

In Step 702 and Step 704, before the period T1 and at the period T1, the timing controller 302 generates the left/right eye signal L/R and the two-dimensional/three-dimensional control signal DCS according to the image signal IS. In Step 706, at the period T1, the microprocessor 304 outputs a right eye image signal of the image signal IS (a three-dimensional image) to the first liquid crystal panel 308 according to the low voltage level left/right eye signal L/R and the high voltage level two-dimensional/three-dimensional control signal DCS. At the period T1, because the first liquid crystal panel 308 rotates the liquid crystals within the first liquid crystal panel 308 according to the right eye image signal of the image signal IS, and the microprocessor 304 does not output backlight control signal BCS, the backlight module 306 turns off the backlight, resulting in the observer not watching crosstalk between a left eye image and the right eye image of the image signal IS. In Step 708, before the period T1 and at the period T1, the microprocessor 304 outputs the high voltage level control signal CS to the controller 310, and outputs the backlight control signal BCS to the backlight module 306 according to output timing of the image signal IS (at the period T1, the microprocessor 304 outputs the right eye image signal of the image signal IS). In Step 710, the controller 310 outputs a voltage control signal VCS with a first voltage V1 to the second liquid crystal panel 312 to make the liquid crystals within the second liquid crystal panel 312 be rotated to the second angle according to the high voltage level control signal CS. In Step 712, the second liquid crystal panel 312 starts to be charged to rotate the liquid crystals within the second liquid crystal panel 312 to the second angle according to the first voltage V1. In Step 714, at the period T2, the backlight module 306 turns on the backlight according to the backlight control signal BCS outputted by the microprocessor 304. In Step 716, at the period T2, the first liquid crystal panel 308 receives and displays the image signal IS. Because the liquid crystals within the second liquid crystal panel 312 are rotated to the second angle, the right eye of the observer can watch the right eye image of the image signal IS having polarization of the second angle through the right eye lens 1104 of the pair of polarized glasses 110 at the period T2. In addition, after the period T2 (that is, at the period T3), the microprocessor 304 outputs the low voltage level control signal CS to the controller 310 according to the output timing of the image signal IS (at a period T3, the microprocessor 304 outputs the left eye image signal of the image signal IS), and the controller 310 outputs the voltage control signal VCS with a second voltage V2 to the second liquid crystal panel 312 according to the low voltage level control signal CS to make the liquid crystals within the second liquid crystal panel 312 be rotated to the first angle. In addition, as shown in FIG. 6, because a period for the second liquid crystal panel 312 starting to be charged to rotate the liquid crystals within the second liquid crystal panel 312 to the second angle (that is, a period TC for the second liquid crystal panel 312 starting to be charged according to the first voltage V1 or a third voltage V3) according to the voltage control signal VCS is longer than a period for the second liquid crystal panel 312 starting to be discharged to rotate the liquid crystals within the second liquid crystal panel 312 to the first angle (that is, a period TD for the second liquid crystal panel 312 starting to be discharged according to the second voltage V2) according to the voltage control signal VCS, and the second liquid crystal panel 312 starts to be charged according to the voltage control signal VCS before the period T1 and the period T5, luminance of the left eye image sensed by the left eye of the observer is similar to luminance of the right eye image sensed by the right eye of the observer, and crosstalk of the first liquid crystal panel 308 can be reduced.

In addition, subsequent operational principles of the timing controller 302, the microprocessor 304, the backlight module 306, the first liquid crystal panel 308, the controller 310, and the second liquid crystal panel 312 at the period T3 to the period T8 in FIG. are the same as those of the timing controller 302, the microprocessor 304, the backlight module 306, the first liquid crystal panel 308, the controller 310, and the second liquid crystal panel 312 at the period T1 to the period T2 in FIG. 6, so further description thereof is omitted for simplicity.

In addition, in the embodiments in FIG. 4 to FIG. 6, when an image signal IS is a two-dimensional image, the microprocessor 304 outputs the image signal IS to the first liquid crystal panel 308 according to a left/right eye signal L/R and a low voltage level two-dimensional/three-dimensional control signal DCS. That is to say, the microprocessor 304 can output the image signal IS (the two-dimensional image) to the first liquid crystal panel 308 regardless of the low voltage level left/right eye signal L/R or the high voltage level left/right eye signal L/R. In the embodiments in FIG. 4 to FIG. 6, when an image signal IS is a two-dimensional image, the right eye of the observer can watch the image signal IS (the two-dimensional image) having polarization of the second angle through the right eye lens 1104 of the pair of polarized glasses 110 at the period T2 and the period T6, and the left eye of the observer can watch the image signal IS (the two-dimensional image) having polarization of the first angle through the left eye lens 1102 of the pair of polarized glasses 110 at the period T4 and the period T8. In addition, when an image signal IS is a two-dimensional image, the microprocessor 304 can keep outputting a backlight control signal BCS (that is, the backlight module 306 always turns on the backlight according to the backlight control signal BCS outputted by the microprocessor 304), or output the backlight control signal BCS according to timing of the backlight control signal BCS corresponding to a three-dimensional image.

To sum up, the double-layer switchable stereo liquid crystal display and the operation method thereof utilizes an asymmetric voltage control signal (shown in FIG. 4 to FIG. 6) of the second liquid crystal panel to rotate the liquid crystals within the second liquid crystal panel. Therefore, a period for the second liquid crystal panel starting to be charged to rotate the liquid crystals within the second liquid crystal panel to the second angle according to the voltage control signal is longer than a period for the second liquid crystal panel starting to be discharged to rotate the liquid crystals within the second liquid crystal panel to the first angle according to the voltage control signal. Thus, compared to the prior art, the present invention can reduce a period for the liquid crystals within the second liquid crystal panel being rotated from the first angle to the second angle to improve crosstalk of the first liquid crystal panel, increase luminance of an image signal (a three-dimensional image or a two-dimensional image), and balance a difference between luminance of an image sensed by the left eye of the observer and luminance of an image sensed by the right eye of the observer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A double-layer switchable stereo liquid crystal display, comprising:
 a timing controller for receiving an image signal, and generating a left/right eye signal and a two-dimensional/three-dimensional control signal according to the image signal;
 a microprocessor coupled to the timing controller for outputting the image signal according to the left/right eye signal and the two-dimensional/three-dimensional control signal, and outputting a control signal and a backlight control signal corresponding to a vertical blanking interval according to output timing of the image signal;
 a backlight module coupled to the microprocessor for turning on backlight according to the backlight control signal;
 a first liquid crystal panel coupled to the microprocessor for receiving and displaying the image signal;

a controller coupled to the microprocessor for outputting a voltage control signal according to the control signal; and a second liquid crystal panel coupled to the controller for rotating liquid crystals within the second liquid crystal panel to a first angle or a second angle according to the voltage control signal, wherein a period for the second liquid crystal panel starting to be charged to rotate the liquid crystals within the second liquid crystal panel to the second angle according to the voltage control signal is longer than a period for the second liquid crystal panel starting to be discharged to rotate the liquid crystals within the second liquid crystal panel to the first angle according to the voltage control signal.

2. The double-layer switchable stereo liquid crystal display of claim 1, wherein the period for the second liquid crystal panel starting to be charged according to the voltage control signal leads a corresponding period for the backlight module turning off the backlight.

3. The double-layer switchable stereo liquid crystal display of claim 2, wherein the first angle corresponds to a left eye lens of a pair of polarized glasses and the second angle corresponds to a right eye lens of the pair of polarized glasses.

4. The double-layer switchable stereo liquid crystal display of claim 2, wherein the period for the second liquid crystal panel starting to be discharged according to the voltage control signal lags a corresponding period for the backlight module turning on the backlight.

5. The double-layer switchable stereo liquid crystal display of claim 4, wherein the first angle corresponds to a left eye lens of a pair of polarized glasses and the second angle corresponds to a right eye lens of the pair of polarized glasses.

6. The double-layer switchable stereo liquid crystal display of claim 1, wherein the period for the second liquid crystal panel starting to be discharged according to the voltage control signal lags a corresponding period for the backlight module turning on the backlight.

7. The double-layer switchable stereo liquid crystal display of claim 6, wherein the first angle corresponds to a left eye lens of a pair of polarized glasses and the second angle corresponds to a right eye lens of the pair of polarized glasses.

8. An operation method of a double-layer switchable stereo liquid crystal display, wherein the double-layer switchable stereo liquid crystal display comprises a timing controller, a microprocessor, a backlight module, a first liquid crystal panel, a second liquid crystal panel, and a controller, the operation method comprising:

receiving an image signal;

generating a left/right eye signal and a two-dimensional/three-dimensional control signal according to the image signal;

outputting the image signal according to the left/right eye signal and the two-dimensional/three-dimensional control signal;

outputting a control signal and a backlight control signal corresponding to a vertical blanking interval according to output timing of the image signal;

outputting a voltage control signal according to the control signal;

rotating liquid crystals within the second liquid crystal panel to a first angle or a second angle according to the voltage control signal;

turning on backlight according to the backlight control signal; and receiving and displaying the image signal;

wherein a period for the second liquid crystal panel starting to be charged to rotate the liquid crystals within the second liquid crystal panel to the second angle according to the voltage control signal is longer than a period for the second liquid crystal panel starting to be discharged to rotate the liquid crystals within the second liquid crystal panel to the first angle according to the voltage control signal.

9. The operation method of claim 8, wherein the period for the second liquid crystal panel starting to be charged according to the voltage control signal leads a corresponding period for the backlight module turning off the backlight.

10. The operation method of claim 9, wherein outputting the image signal according to the left/right eye signal and the two-dimensional/three-dimensional control signal is the microprocessor outputting a left eye image signal and a right eye image signal of the image signal to the first liquid crystal panel in turn according to the left/right eye signal and the two-dimensional/three-dimensional control signal when the image signal is a three-dimensional image.

11. The operation method of claim 10, wherein the microprocessor outputting the left eye image signal and the right eye image signal of the image signal to the first liquid crystal panel in turn according to the left/right eye signal and the two-dimensional/three-dimensional control signal comprises:

outputting the left eye image signal of the image signal to the first liquid crystal panel when the left/right eye signal is at a high voltage level; and outputting the right eye image signal of the image signal to the first liquid crystal panel when the left/right eye signal is at a low voltage level.

12. The operation method of claim 10, wherein the microprocessor outputting the left eye image signal and the right eye image signal of the image signal to the first liquid crystal panel in turn according to the left/right eye signal and the two-dimensional/three-dimensional control signal comprises:

outputting the right eye image signal of the image signal to the first liquid crystal panel when the left/right eye signal is at a high voltage level; and outputting the left eye image signal of the image signal to the first liquid crystal panel when the left/right eye signal is at a low voltage level.

13. The operation method of claim 9, wherein outputting the image signal according to the left/right eye signal and the two-dimensional/three-dimensional control signal is the microprocessor outputting the image signal to the first liquid crystal panel according to the left/right eye signal and the two-dimensional/three-dimensional control signal when the image signal is a two-dimensional image.

14. The operation method of claim 9, wherein the period for the second liquid crystal panel starting to be discharged according to the voltage control signal lags a corresponding period for the backlight module turning on the backlight.

15. The operation method of claim 14, wherein outputting the image signal according to the left/right eye signal and the two-dimensional/three-dimensional control signal is the microprocessor outputting a left eye image signal and a right eye image signal of the image signal to the first liquid crystal panel in turn according to the left/right eye signal and the two-dimensional/three-dimensional control signal when the image signal is a three-dimensional image.

16. The operation method of claim 15, wherein the microprocessor outputting the left eye image signal and the right eye image signal of the image signal to the first liquid crystal panel in turn according to the left/right eye signal and the two-dimensional/three-dimensional control signal comprises:

outputting the left eye image signal of the image signal to the first liquid crystal panel when the left/right eye signal is at a high voltage level; and outputting the right eye image signal of the image signal to the first liquid crystal panel when the left/right eye signal is at a low voltage level.

17. The operation method of claim 15, wherein the microprocessor outputting the left eye image signal and the right eye image signal of the image signal to the first liquid crystal panel in turn according to the left/right eye signal and the two-dimensional/three-dimensional control signal comprises:

outputting the right eye image signal of the image signal to the first liquid crystal panel when the left/right eye signal is at a high voltage level; and outputting the left eye image signal of the image signal to the first liquid crystal panel when the left/right eye signal is at a low voltage level.

18. The operation method of claim 14, wherein outputting the image signal according to the left/right eye signal and the two-dimensional/three-dimensional control signal is the microprocessor outputting the image signal to the first liquid crystal panel according to the left/right eye signal and the two-dimensional/three-dimensional control signal when the image signal is a two-dimensional image.

19. The operation method of claim 8, wherein the period for the second liquid crystal panel starting to be discharged according to the voltage control signal lags a corresponding period for the backlight module turning on the backlight.

20. The operation method of claim 19, wherein outputting the image signal according to the left/right eye signal and the two-dimensional/three-dimensional control signal is the microprocessor outputting a left eye image signal and a right eye image signal of the image signal to the first liquid crystal panel in turn according to the left/right eye signal and the two-dimensional/three-dimensional control signal when the image signal is a three-dimensional image.

21. The operation method of claim 20, wherein the microprocessor outputting the left eye image signal and the right eye image signal of the image signal to the first liquid crystal panel in turn according to the left/right eye signal and the two-dimensional/three-dimensional control signal comprises:

outputting the left eye image signal of the image signal to the first liquid crystal panel when the left/right eye signal is at a high voltage level; and outputting the right eye image signal of the image signal to the first liquid crystal panel when the left/right eye signal is at a low voltage level.

22. The operation method of claim 20, wherein the microprocessor outputting the left eye image signal and the right eye image signal of the image signal to the first liquid crystal panel in turn according to the left/right eye signal and the two-dimensional/three-dimensional control signal comprises:

outputting the right eye image signal of the image signal to the first liquid crystal panel when the left/right eye signal is at a high voltage level; and outputting the left eye image signal of the image signal to the first liquid crystal panel when the left/right eye signal is at a low voltage level.

23. The operation method of claim 19, wherein outputting the image signal according to the left/right eye signal and the two-dimensional/three-dimensional control signal is the microprocessor outputting the image signal to the first liquid crystal panel according to the left/right eye signal and the two-dimensional/three-dimensional control signal when the image signal is a two-dimensional image.

* * * * *